United States Patent Office 2,721,213
Patented Oct. 18, 1955

2,721,213

2 - METHYL - 4 - ETHOXY - 5 - TERTIARY BUTYLACETANILIDE AND PREPARATION THEREOF

Aram Mooradian, Nassau, N. Y., assignor to Sterling Drug Inc., New York, N. Y., a corporation of Delaware No Drawing. Application May 13, 1953,
Serial No. 354,899

3 Claims. (Cl. 260—562)

This invention relates to a new chemical compound, namely 2-methyl-4-ethoxy-5-tertiary butylacetanilide, and to a method for preparing the same.

The new compound of my invention, which has the structural formula

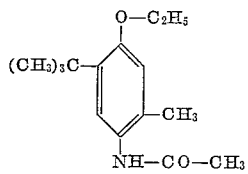

has surprising pharmacological properties. Thus, in addition to exhibiting antipyretic and anticonvulsant properties itself, the compound has been discovered to be useful for potentiating the activity of a number of pharmacological agents. In particular, it has been found that the administration of 2-methyl-4-ethoxy-5-tertiary butylacetanilide along with analgesics, central nervous system depressants, or anticonvulsants, such as for example morphine, meperidine, hydantoins, and barbituric acids, results unexpectedly in a potentiation of the analgesic, depressant, or anticonvulsant activity of these drugs. It is not necessary to administer the 2-methyl-4-ethoxy-5- tertiary butylacetanilide by the same route as the drug to be potentiated, although this can be done if convenient. In general, it has been found that my new compound can most effectively be administered orally, or in some instances intraperitoneally, in a dosage by weight of about 5 per cent to 200 per cent or more that of the drug to be potentiated; the low toxicity of my new compound permits its use in rather large doses without the appearance of undesirable side effects. The two substances can be administered either at the same time; or, has been found advantageous in some cases, the 2-methyl-4-ethoxy-5-tertiary butylacetanilide can be administered a short time before the other drug.

As a specific instance of the potentiating properties of the compound of my invention, when 2-methyl-4-ethoxy-5-tertiary butylacetanilide is administered intraperitoneally to mice along with hexobarbital in an amount approximating 5 per cent by weight of the dose of the barbiturate, there results a doubling of the duration of hypnosis, as evidenced by sleeping time, when compared with the duration of hypnosis when the same quantity of the barbiturate is employed alone. The 2-methyl-4-ethoxy-5-tertiary butylacetanilide alone exhibits no hypnotic activity and no significant analgesic activity.

The preparation of my new compound is carried out by interacting an ethylating agent with an alkali metal salt of 2-methyl-4-hydroxy-5-tertiary butylacetanilide, thereby yielding the desired 2-methyl-4-ethoxy-5-tertiary butylacetanilide. The ethylating agent can be an ethyl ester of a strong mineral acid or strong organic sulfonic acid, for example ethyl sulfate or an ethyl halide such as ethyl chloride or ethyl bromide.

The alkali metal salt of 2-methyl-4-hydroxy-5-tertiary butylacetanilide employed in my process can be obtained conveniently by interacting the phenol with an alkali metal hydroxide such as potassium hydroxide or sodium hydroxide. The 2-methyl-4-hydroxy-5-tertiary butylacetanilide can be obtained by nitrosating 2-tertiary butyl-5-methylphenol to yield 2-tertiary butyl-4-nitroso-5-methylphenol, reducing this product to yield the corresponding 4-amino compound, and N-acetylating this latter product.

My invention is illustrated by the following example without, however, being limited thereto.

Example

A. 32.8 g. of 2-tertiary butyl-5-methylphenol, 150 ml. of anhydrous ethanol and 150 ml. of concentrated (about 36%) hydrochloric acid were placed in a beaker fitted with a stirrer, thermometer and dropping funnel. The mixture was cooled to 0° C. and through the dropping funnel there was added a solution of 21 g. of sodium nitrite in 50 ml. of water. The reaction mixture was then added with stirring to two liters of water. The yellow solid which separated from the solution, which consisted of 2-tertiary butyl-4-nitroso-5-methylphenol, was collected on a filter.

B. The 2-tertiary butyl-4-nitroso-5-methylphenol obtained as described above was placed in a beaker fitted with a stirrer and a gas inlet tube, and 480 ml. of water and 360 ml. of 28% ammonium hydroxide were added to the phenol. The mixture was stirred and the small amount of solid which failed to go into solution was removed by filtration. Hydrogen sulfide was bubbled through the filtrate until the reaction mixture turned yellow and solid began to separate from the solution. Hydrogen sulfide was bubbled through the mixture for a further period of twenty to thirty minutes, and the mixture was then filtered. The solid thus collected on the filter was washed with water. The white crystalline solid thus obtained consisted of 2-tertiary butyl-4-amino-5-methylphenol.

C. The 2-tertiary butyl-4-amino-5-methylphenol obtained as described above was mixed with 350 ml. of water and 21 ml. of glacial acetic acid, and the mixture was cooled to 10° C. To this solution there was added in one portion 43 ml. of acetic anhydride. The reaction mixture was stirred for one hour while allowing the temperature of the mixture to rise gradually from 10° C. to room temperature (about 25° C.). 20 ml. of acetic anhydride was then added to the reaction mixture, with further stirring for one-half hour. The mixture was then allowed to stand at room temperature overnight (about fifteen hours). The solid which had separated from the reaction mixture was collected on a filter, and washed with water. There was thus obtained 2-methyl-4-hydroxy-5-tertiary butylacetanilide. The crude product melted at 209–211° C.

D. 40 g. of 2-methyl-4-hydroxy-5-tertiary butylacetanilide, 100 ml. of 95% ethyl alcohol and a solution of 8.1 g. of 98% sodium hydroxide in 100 ml. of water were placed together in a three-neck flask fitted with a stirrer, condenser, thermometer and a dropping funnel. The mixture was heated and stirred on a steam bath for one-half hour and then cooled. To this mixture, which contained the sodium salt of 2-methyl-4-hydroxy-5-tertiary butylacetanilide, there was added 25 g. of ethyl bromide. The reaction mixture was heated on the steam bath for three hours, an additional 5 g. of ethyl bromide being added to the reaction mixture at the end of the first hour of heating. The reaction mixture was poured into one liter of ice water, and the solid which separated from the solution was collected on a filter. This solid was slurried in 50 ml. of 10% aqueous sodium hydroxide solution, and the slurry was then filtered. The solid thus collected on the filter was recrystallized from aqueous ethyl alcohol solution. There was thus obtained 18 g. of 2-methyl-4-ethoxy-5-tertiary butylacetanilide which melted at 172–173° C.

I claim:
1. 2-methyl-4-ethoxy-5-tertiary butylacetanilide, having the structural formula

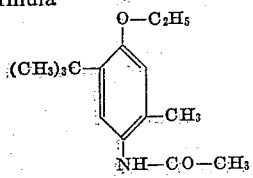

2. The process for preparing 2-methyl-4-ethoxy-5-tertiary butylacenanilide which comprises ethylating an alkali metal salt of 2-methyl-4-hydroxy-5-tertiary butylacetanilide.
3. The process for preparing 2-methyl-4-ethoxy-5-tertiary butylacetanilide which comprises reacting ethyl bromide with the sodium salt of 2-methyl-4-hydroxy-5-tertiary butylacetanilide.

References Cited in the file of this patent
FOREIGN PATENTS

| | | |
|---|---|---|
| 19,187 of 1894 | Great Britain | July 9, 1895 |
| 67,568 | Germany | Feb. 23, 1893 |

OTHER REFERENCES

Wallach et al., "Ber. deut. Chem.," vol. 28 (1895), p. 1663.
"Chemical Abstracts," vol. 42 (1948), p. 7271.